US012683259B2

(12) United States Patent
Jian et al.

(10) Patent No.: US 12,683,259 B2
(45) Date of Patent: Jul. 14, 2026

(54) HYBRID TYPE FILTER SOLUTION

(71) Applicant: Telefonaktiebolaget LM Ericsson (publ), Stockholm (SE)

(72) Inventors: Chunyun Jian, Ottawa (CA); Mi Zhou, Nepean (CA); Zhen Hong Wang, Stittsville (CA); Richard Wang, Ottawa (CA); Sven Patrik Lindell, Sollentuna (SE); Anders Jansson, Taby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 18/551,279

(22) PCT Filed: Mar. 10, 2022

(86) PCT No.: PCT/IB2022/052179

§ 371 (c)(1),
(2) Date: Sep. 19, 2023

(87) PCT Pub. No.: WO2022/208203

PCT Pub. Date: Oct. 6, 2022

(65) Prior Publication Data

US 2024/0178538 A1 May 30, 2024

Related U.S. Application Data

(60) Provisional application No. 63/168,626, filed on Mar. 31, 2021.

(51) Int. Cl.
*H01P 1/208* (2006.01)
*H01P 1/205* (2006.01)
(Continued)

(52) U.S. Cl.
CPC .......... *H01P 1/2138* (2013.01); *H01P 1/2053* (2013.01); *H01P 1/208* (2013.01); *H01P 1/2136* (2013.01); *H01P 5/1022* (2013.01)

(58) Field of Classification Search
CPC .... H01P 1/2138; H01P 1/2088; H01P 1/2136; H01P 1/2053; H01P 1/208
(Continued)

(56) References Cited

U.S. PATENT DOCUMENTS

| | | | | |
|---|---|---|---|---|
| 6,806,791 | B1 * | 10/2004 | Wang | H01P 1/2136 333/202 |
| 10,818,989 | B2 | 10/2020 | Zhang et al. | |

(Continued)

FOREIGN PATENT DOCUMENTS

| | | | |
|---|---|---|---|
| CN | 109983616 | B | 7/2020 |
| CN | 112563713 | A | 3/2021 |

(Continued)

OTHER PUBLICATIONS

Invitation to Pay Additional Fees and, Where Applicable, Protest Fee dated Jun. 3, 2022 issued in PCT Application PCT/IB2022/052179 filed Mar. 10, 2022, consisting of 11 pages.

(Continued)

*Primary Examiner* — Rakesh B Patel
(74) *Attorney, Agent, or Firm* — Sonoda & Kobayashi Intellectual Property Law; Sarvajit S. Patil

(57) ABSTRACT

Hybrid structures, filters and duplexers are disclosed. According to one aspect, a radio frequency (RF) duplexer includes a common resonator coupled to at least one chamber of an air cavity filter, a first ceramic waveguide filter. CWGF, having a first opening in a first CWG wall of the first CWGF, the first opening at least partially aligned with a first window of the common resonator to couple energy between the common resonator and the CWGF, and a second CWGF having a second opening in a second CWG wall of the second CWGF, the second opening at least partially aligned with the second window of the common resonator to couple energy between the air cavity resonator and the CWGF.

27 Claims, 12 Drawing Sheets

(51) Int. Cl.
*H01P 1/213* (2006.01)
*H01P 5/10* (2006.01)

(58) Field of Classification Search
USPC .................................................. 333/208–212
See application file for complete search history.

(56) References Cited

U.S. PATENT DOCUMENTS

| | | | | |
|---|---|---|---|---|
| 2015/0061793 | A1 | 3/2015 | Zhou | |
| 2015/0077198 | A1 | 3/2015 | Yatabe | |
| 2019/0280358 | A1 | 9/2019 | Zhang et al. | |
| 2021/0066774 | A1* | 3/2021 | Kufa | H01P 1/2138 |
| 2023/0261353 | A1* | 8/2023 | Park | H01P 1/2002 343/702 |

FOREIGN PATENT DOCUMENTS

| | | | |
|---|---|---|---|
| GB | 2528390 | A | 1/2016 |
| WO | 2018/098642 | A1 | 7/2018 |

OTHER PUBLICATIONS

International Search Report and Written Opinion dated Jul. 25, 2022 issued in PCT Application PCT/IB2022/052179 filed Mar. 10, 2022, consisting of 19 pages.

* cited by examiner

3D VIEW

FIELD LINES AT SECTION A-A

E-FIELD LINE

H-FIELD LINE

FIELD LINES AT SECTION B-B

E-FIELD LINE

H-FIELD LINE

FRONT VIEW

FIELD LINES AT SECTION C-C

TOP VIEW

FRONT VIEW

HYBRID TYPE FILTER SOLUTION

CROSS-REFERENCE TO RELATED APPLICATIONS

This application is a Submission Under 35 U.S.C. § 371 for U.S. National Stage Patent Application of International Application No.: PCT/IB2022/052179, filed Mar. 10, 2022 entitled "HYBRID TYPE FILTER SOLUTION," which claims priority to U. S. Provisional Application No.: 63/168,626, filed Mar. 31, 2021, entitled "HYBRID TYPE FILTER SOLUTION" the entireties of both of which are incorporated herein by reference.

FIELD

The present disclosure relates to wireless communications, and in particular, to hybrid filter solutions.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

All of these standards, as well as other radio access technologies (RATs), contemplate transmission and reception in multiple frequency bands. Radio frequency (RF) transceivers at a radio base station may employ filters to filter signals to be transmitted by a radio transmitter of the transceiver as well as to filter signals that are received by a radio receiver of the transceiver. In particular, air cavity filters have high Q, where a high Q indicates that the air cavity filter has high frequency selectivity and energy storage capability. However, air cavity filters are large, heavy and expensive. In contrast to air cavity filters, ceramic wave guide filters (CWGF) are smaller, weigh less and are less expensive. However, ceramic wave guide filters have a lower Q than air cavity filters.

According to one proposal, an air cavity filter is employed for transmission and a CWGF is employed for reception. However, a problem remains how to efficiently combine these filters for frequency division duplex (FDD) applications, where transmission is at one frequency and reception is at another frequency. The air cavity filter is much different in design and operation than the CWGF. In particular, the air cavity filter and the CWGF are different in size, materials, and location of manufacture.

In one attempt to combine these two types of filters, a printed circuit board (PCB) has transmission lines that connect to the CWGF. The PCB is mounted close to the air cavity filter and connected to the air cavity filter by a cable. The two filters are ideally matched at the antenna port by adjusting the length of the cable according to a T-junction matching principle. Problems with this approach include additional loss due at least in part to difficulty in selecting the best length of cable to match the PCB to the air cavity filter. More particularly, the T-junction matching approach cannot provide matching for all ports of a dual band duplexer structure.

SUMMARY

Some embodiments advantageously provide hybrid structures, filters and duplexers. Accordingly, some embodiments provide combinations of air cavity resonators or filters with ceramic wave guide resonators or filters. Some combinations disclosed herein contribute no additional loss, the loss being only that of each filter in the combination. Further, some combinations disclosed herein are compact. Single band, dual band and multiband configurations are disclosed herein. Some embodiments are duplexers and multiplexers that provide high performance with less weight and complexity than known solutions.

According to one aspect, an electromagnetic structure is provided. The structure has an air cavity resonator having a resonator post, and at least a first side wall, the first side wall of the air cavity resonator having a first window parallel to a center axis of the resonator post. The structure also has a first ceramic waveguide, CWG, resonator having an opening in a side wall of the first CWG resonator, the opening being parallel to and at least partially aligned with the first window of the air cavity resonator to couple energy between the air cavity resonator and the CWG resonator. The structure also includes a first bridge having a length that extends from the resonator post through the first window of the air cavity resonator into an interior region of the CWG resonator.

According to this aspect, in some embodiments, the first bridge includes an electric conductor that makes contact with an edge of the first window of the air cavity resonator. In some embodiments, the first CWG resonator is configured to support a transverse electric (TE) mode with a magnetic field aligned with a magnetic field supported by the air cavity resonator. In some embodiments, the air cavity resonator has a second side wall having a second window and the structure further comprises: a second CWG resonator having a second opening in a side wall of the second CWG resonator, the second opening being parallel to and at least partially aligned with the second window of the air cavity resonator to couple energy between the air cavity resonator and the second CWG resonator. In some embodiments, the structure further includes a second bridge having a length that extends from the resonator post through the second window of the air cavity resonator into an interior region of the second CWG resonator. In some embodiments, the first window of the air cavity resonator is orthogonal to the second window of the air cavity resonator. In some embodiments, the first window of the air cavity resonator is at a first height above a bottom wall of the air cavity resonator and the second window of the air cavity resonator is at a second height above a bottom wall of the air cavity resonator, the second height being different from the first height. In some embodiments, the first CWG resonator and the second CWG resonator are rectangular with parallel broad walls and parallel narrow walls, the narrow walls being parallel to a center axis of the resonator post. In some embodiments, the first window of the air cavity resonator is at a first height above a bottom wall of the air cavity resonator, the first height being selected to obtain a specified minimum coupling bandwidth between the air cavity resonator and the first CWGF. In some embodiments, the second window of the air cavity resonator is at a second height above the bottom wall of the air cavity resonator, the second height being selected to reduce coupling of energy between the first and second CWG resonators to below a specified maximum allowable coupling. In some embodiments, the first window has a thickness forming a middle region between an interior region of the air cavity resonator and an interior region of the CWG resonator, the middle region having a material with a relative permittivity greater than one.

According to another aspect, a radio frequency (RF) duplexer is provided. The duplexer includes a common resonator being coupled to at least one chamber of an air cavity filter, the common resonator having a common resonator bottom wall, a plurality of common resonator side walls and a common resonator post, a first common resonator side wall of the plurality of common resonator side walls having a first window and a second common resonator side wall of the plurality of common resonator side walls having a second window. The duplexer also has a first ceramic waveguide filter, CWGF, having a first opening in a first CWG wall of the first CWGF, the first opening being parallel to and at least partially aligned with the first window of the common resonator to couple energy between the common resonator and the CWGF. The duplexer also has a second CWGF having a second opening in a second CWG wall of the second CWGF, the second opening being parallel to and at least partially aligned with the second window of the common resonator to couple energy between the air cavity resonator and the CWGF.

According to this aspect, in some embodiments, the first CWGF has a first CWG bottom wall positioned at a first height above the common resonator bottom wall and the second CWGF has a second CWG bottom wall at a second height above the common resonator bottom wall, the first and second heights being equal. In some embodiments, the first CWGF has a first CWG bottom wall positioned at a first height above the common resonator bottom wall and the second CWGF has a second CWG bottom at a second height above the common resonator bottom wall, the first and second heights being unequal. In some embodiments, the first common resonator side wall of the plurality of common resonator side walls to which the first CWG wall is adjoined is orthogonal to the second common resonator side wall of the plurality of common resonator side walls to which the second CWG wall is adjoined. In some embodiments, the first common resonator side wall of the plurality of common resonator side walls is the same side wall as the second common resonator side wall of the plurality of common resonator side walls. In some embodiments, the duplexer also includes a first bridge having a first length that extends from an interior region of the common resonator to an interior region of the first CWGF through the first window and first opening. In some embodiments, the duplexer also includes a second bridge having a second length that extends from the interior region of the common resonator to an interior region of the second metal cavity through the second window and second opening. In some embodiments, the common resonator is coupled to a first chamber of a first air cavity filter and is coupled to a second chamber of a second air cavity filter. In some embodiments, the second CWGF has a plurality of resonator sections on a first level and another resonator section at an end and on a second level above the first level. In some embodiments, the first and second CWGs are coupled to a receiver and the air cavity filter is coupled to a transmitter.

According to yet another aspect, a dual band duplexer is provided. The duplexer includes a common resonator coupled on a first side of the common resonator to a chamber of a first air cavity filter and separately coupled on the first side to a chamber of a second air cavity filter. The duplexer also includes a first air cavity resonator having a first side coupled to a second side of the common resonator, the second side of the common resonator being opposite the first side of the common resonator. The duplexer also includes a second air cavity resonator having a first side coupled to the second side of the common resonator. The duplexer further includes a first ceramic waveguide filter, CWGF, coupled at an end wall to a second side of the first air cavity resonator, the second side of the first air cavity resonator being opposite the first side of the first air cavity resonator; and a second CWGF coupled at an end wall to a second side of the second air cavity resonator, the second side of the second air cavity resonator being opposite the first side of the second air cavity resonator.

According to this aspect, in some embodiments, the duplexer further includes a first bridge having a first length extending from an interior of the first air cavity resonator to an interior of the first CWGF through a first coupling window. In some embodiments, the duplexer also includes a second bridge having a second length extending from an interior of the second air cavity resonator to an interior of the second CWGF through a second coupling window. In some embodiments, dimensions of the second CWGF equal the corresponding dimensions of the first CWGF.

According to another aspect, an electromagnetic filter is provided. The electromagnetic filter includes an air cavity filter having: a bottom wall, parallel side walls, a first end wall at a first end of the air cavity filter, the first end wall having a first input/output port, and a second end wall at a second end of the air cavity filter opposite the first end of the air cavity filter. The air cavity filter also has a first chamber at the first end of the air cavity filter, the first chamber being formed in part by the first end wall and the parallel side walls; and a second chamber at the second end of the air cavity filter, the second chamber having a resonator post, the second chamber being formed in part by the second end wall and the parallel side walls, a first side wall of the parallel side walls having a first window located in the second chamber. The electromagnetic filter also includes a ceramic waveguide filter, CWGF, having parallel first and second broad walls, the first broad wall being adjacent to the first side wall of the parallel side walls, the first broad wall having an opening at least partially aligned with the first window located in the second chamber, the second broad wall having a second input/output port.

According to this aspect, in some embodiments, the electromagnetic filter further includes a bridge that extends from an interior region of the second chamber through the first window and the opening to an interior region of the CWGF. In some embodiments, the opening in the first broad wall of the CWGF and the second input/output port in the second broad wall of the CWGF are near opposite ends of the CWGF. In some embodiments, an area of the first broad wall of the CWGF is smaller than an area of the first side wall of the parallel side walls of the air cavity filter and wherein the opening is further away from the first input/output port than to the second input/output port. In some embodiments, the CWGF is configured to support a transverse electric (TE) mode with an electric field aligned with a radial electric field supported by the air cavity resonator.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1A:
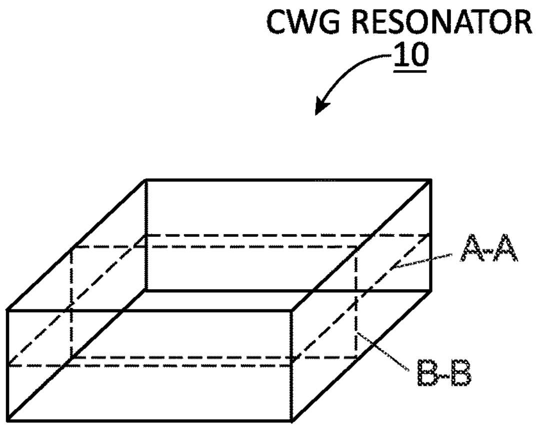
FIG. 1A is a three-dimensional illustration of a ceramic waveguide (CWG) resonator.

Before describing in detail exemplary embodiments, it is noted that the embodiments reside primarily in combinations of apparatus components and processing steps related to hybrid structures, filters and duplexers. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein. Some embodiments provide hybrid structures, filters and duplexers. More particular, some embodiments provide efficient ways to combine air cavity filters and/or resonators with ceramic waveguide (CWG) filters and/or resonators. In some embodiments, the hybrid structures, filters and duplexers may be used in network nodes.

Figure 1B:
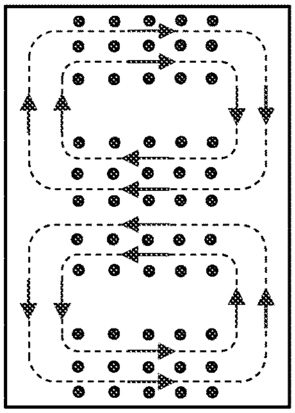
FIG. 1B is a top view of modes in the CWG resonator.
Figure 1C:
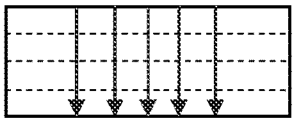
FIG. 1C is a side view of modes in the CWG resonator.
Figure 2A:
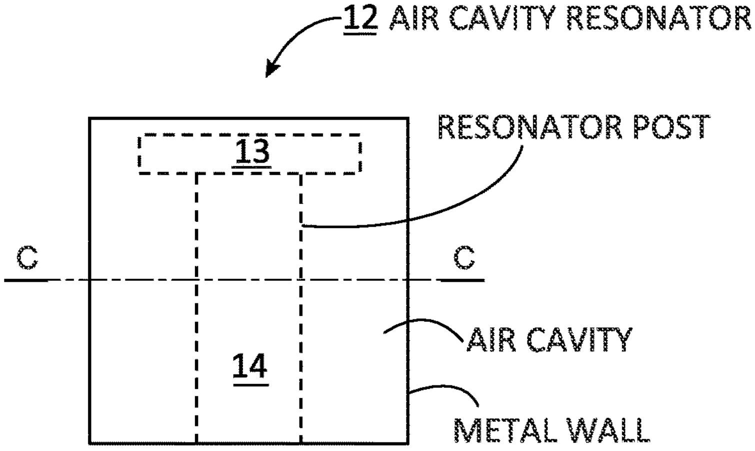
FIG. 2A is a front view of an air cavity resonator.
Figure 2B:
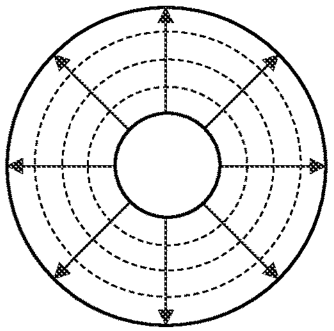
FIG. 2B is a top view of mode in the air cavity resonator.

Referring now to the drawing figures, in which like elements are referred to by like reference numerals, there is shown in FIGS. 1A, 1B and 1C an example of a CWG resonator 10. An example of an air cavity resonator 12 is shown in FIGS. 2A and 2B. The CWG resonator 10 is partially or entirely filled with a ceramic having a relative permittivity greater than the relative permittivity of air. The air cavity resonator 12 has a resonator post 14 with a top hat-hat like structure 13, and may otherwise be filled with air and/or tuning structures or bridges (not shown in FIGS. 2A and 2B). Both the CWG resonator 10 and air cavity resonator 12 have electrically conducting walls.

The electric and magnetic field lines in the CWG resonator 10 shown in FIGS. 1B and 1C are fields of a transverse electric (TE) mode of operation of the CWG resonator 10. The electric and magnetic field lines in the air cavity resonator 12 shown in FIG. 2B are fields of a transverse electromagnetic (TEM) mode of operation of the air cavity resonator 12. Note that other shapes of a CWG resonator, such as a cylindrical or prismatic shape, may be employed. Also, other shapes of an air cavity resonator may be employed. The distribution of electric fields and magnetic fields within a resonator, air cavity resonator or CWG resonator, will generally depend on the shape, size and frequency of operation of the respective resonator, and embodiments are not limited to shapes having rectangular cross sections.

Figure 3:
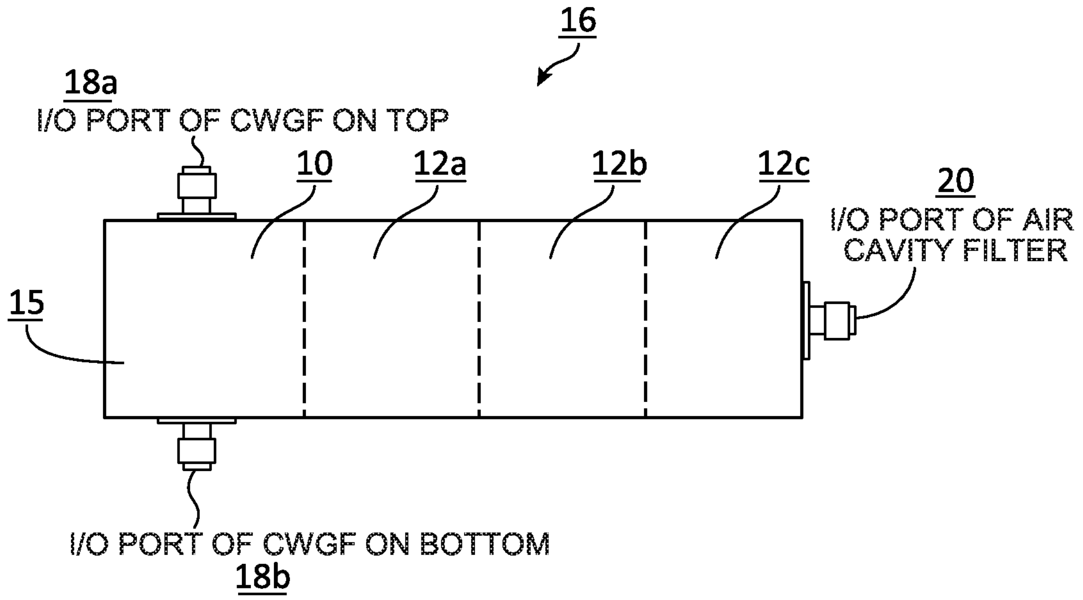
FIG. 3 is an illustration of a configuration of an air cavity filter combined with a ceramic waveguide filter (CWGF)

FIG. 3 illustrates one possible way of combining a ceramic waveguide filter (CWGF) 15 to an air cavity filter 16. In the example of FIG. 3, the CWGF 15 may comprise one or more CWG resonators 10, and the air cavity filter 16 may include a plurality of air cavity resonators 12*a*, 12*b* and 12*c*, herein referred to collectively as air cavity resonators 12. More or less than three air cavity resonators 12 may be employed to construct the air cavity filter 16. Note also that the individual air cavity resonators 12*a*, 12*b* and 12*c* may sometimes be referred to as air cavity filter sections or air cavity filter chambers or air cavity filter stages. In the embodiment of FIG. 3, the input output (I/O) port 18*a* and/or I/O port 18*b* may couple energy into and out of the CWGF 15, whereas the I/O port 20 may couple energy into and out of the air cavity filter 16. Both the CWGF 15 and the air cavity filter 16 have electrically conducting walls.

One disadvantage of the embodiment of FIG. 3 is that the CWGF I/O ports 18*a* and 18*b* are at the top and bottom of the CWGF 15, whereas the air cavity filter I/O port 20 is on a side of the filter combination. This may be unsuitable for radio designs where all I/O ports are intended to be on sides of the combined filter structure rather than having some I/O ports on the sides and some I/O ports on the top or bottom. Another disadvantage of the embodiment of FIG. 3 is that the combination of the air cavity filter 16 and the CWGF 15 extends the overall length of the combined filter structure.

Figure 4A:
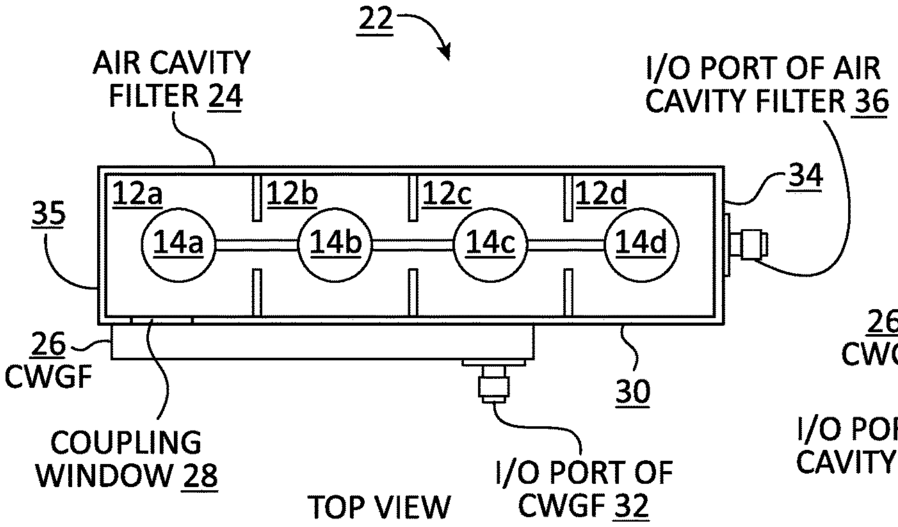
FIG. 4A is top view of an alternative configuration of an air cavity filter combined with a CWGF.
Figure 4B:
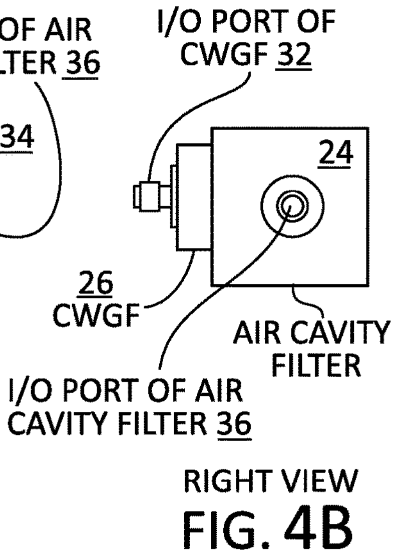
FIG. 4B is a right view of the configuration of FIG. 4A.
Figure 4C:
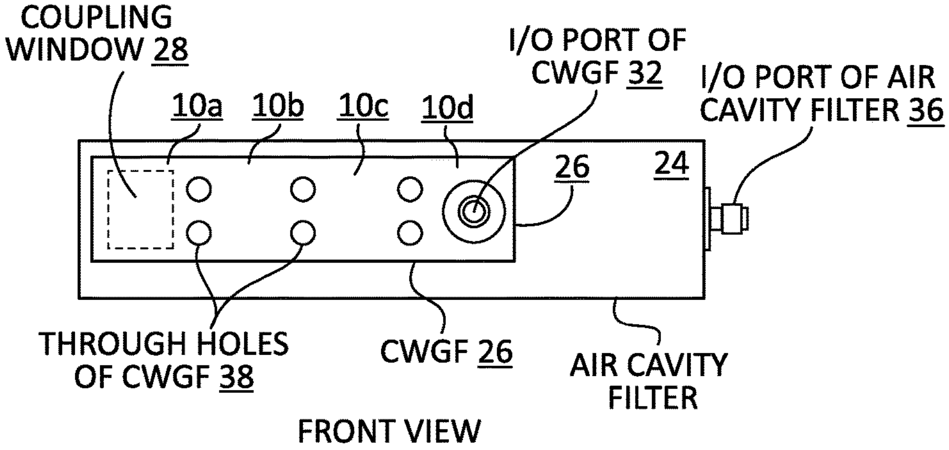
FIG. 4C is a front view of the configuration of FIG. 4A.

FIGS. 4A, 4B and 4C illustrate an embodiment that addresses and overcomes these two disadvantages of the embodiment of FIG. 3. In FIGS. 4A, 4B and 4C, a combined filter structure 22 has an air cavity filter 24 and a CWGF 26 that are coupled through a window 28 in a side wall 30 of the air cavity filter 24 and through an opening in a first broad wall of the CWGF 26. The window 28 is at least partially aligned with the opening in the first broad wall of the CWGF 26 so that energy can be transferred between the air cavity filter 24 and the CWGF 26. The window 28 may be the same size as the opening in the first broad wall of the CWGF 26 or may be a different size than opening in the first broad wall of the CWGF 26. The first broad wall of the CWGF 26 is adjacent to the side wall of the air cavity filter 24. In a second broad wall of the CWGF 26 that is parallel and opposite to the first broad wall of the CWGF 26, there is an I/O port 32 that is orthogonal to the side wall 30 of the air cavity filter 24. In an end wall 34 of the air cavity filter 24 is an I/O port 36 that is orthogonal to the end wall 34 of the air cavity filter 24 and is at an opposite end from the second end wall 35 of the air cavity filter 24. Note that in this configuration, all I/O ports are on the sides of the combined filter structure, rather than some I/O ports being on the sides of the combined filter structure and some I/O ports being on the top or bottom of the combined filter structure. Note also that because the CWGF 26 is on the side of the air cavity filter 24, rather than at an end of the air cavity filter 24, and does not extend beyond the boundaries of the side wall 30 of the air cavity filter 24, the combined filter structure 22 is no longer than the length of the air cavity filter 24, and the combined filter structure 22 is also no taller than the air cavity filter 24.

In the embodiment of FIGS. 4A, 4B and 4C, the air filter cavity may comprise multiple air cavity resonators 12*a*-12*d*, with the air cavity resonator 12*a* at one end of the air cavity filter 24 having the window 28 and with the air cavity resonator 12*d* at the other end 34 of the air cavity filter 24 having the I/O port 36. More or less than four air cavity resonators 12 may be implemented. Also, the CWGF 26 may include through holes 38 that divide the CWGF 26 into CWGF sections 10*a*, 10*b*, 10*c* and 10*d*, each CWGF section being a stage of the CWGF 26. More or less than four CWGF sections 10 may be implemented. Each additional CWGF section 10 may increase an order of filtering provided by the CWGF 26. Similarly, each additional air cavity resonator 12 added to the air cavity filter 24 may increase the order of filtering provided by the air cavity filter 24.

Figure 5A:
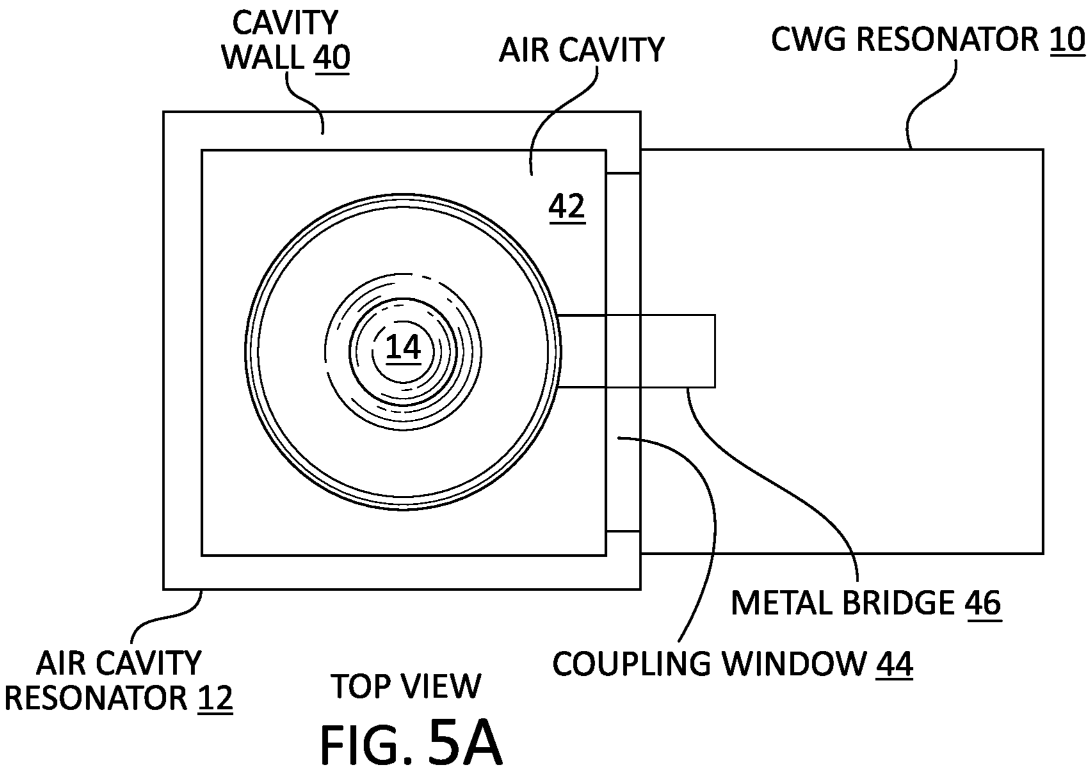
FIG. 5A is top view of a CWG resonator combined with an air cavity resonator.
Figure 5B:
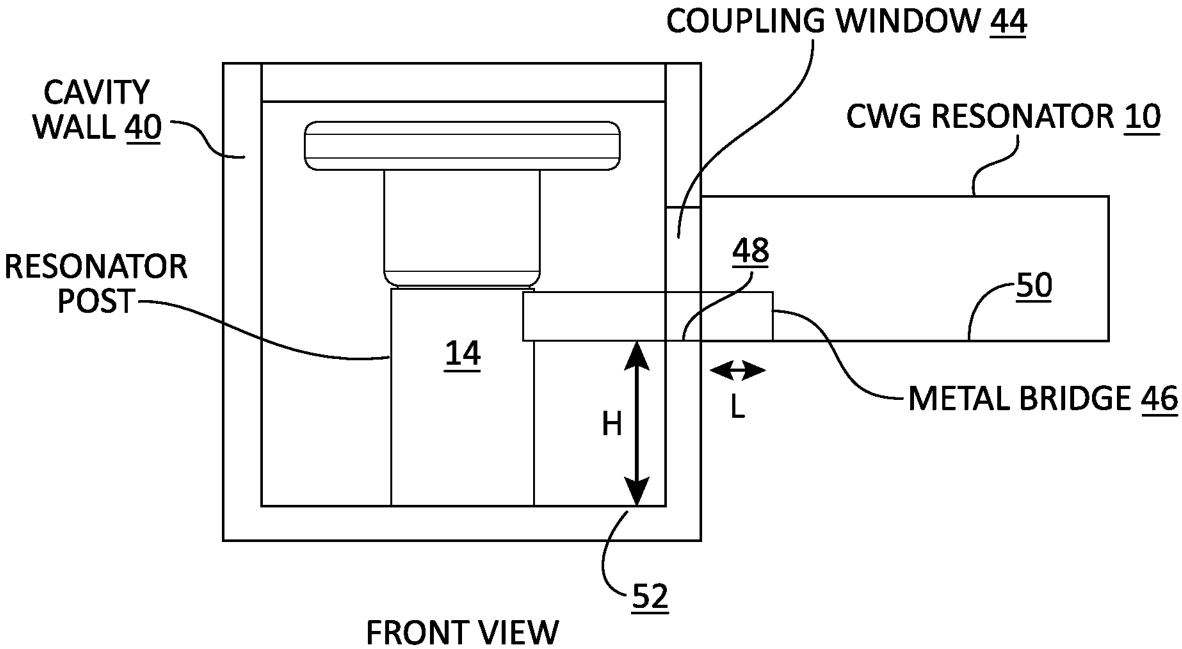
FIG. 5B is a front view of the configuration of FIG. 5A.

FIGS. 5A and 5B illustrate an example embodiment of one way to combine an air cavity resonator 12 and a CWG resonator 10. In the example of FIGS. 5A and 5B, the air cavity resonator has a cavity wall 40 around an air cavity 42. A window 44 couples energy between the air cavity resonator 12 and the CWG resonator 10 through the window 44 and through a corresponding opening in a wall of the CWG resonator 10 that is adjacent to the window 44. The size of the window 44 may be equal to, greater than, or less than the size of the opening in the wall of the CWG resonator 10. In some embodiments, the size of the opening in the wall of the CWG resonator 10 may be coextensive with an entire side of the CWG resonator 10.

In some embodiments, a metal bridge 46 may extend from the resonator post 14 of the air cavity resonator 12 through the window 44, through the opening in the wall of the CWG resonator 10 and into the CWG resonator 10 by a distance L. The metal bridge 46 may be rectangular in cross section and have a side that makes electrically conductive contact with a lower edge 48 of the window 44. The presence of the metal bridge 46 greatly improves the coupling of energy between the air cavity resonator 12 and the CWG resonator 10, and this is true regardless of the size of the opening in the wall of the CWG resonator 10, in some embodiments. The amount of coupling between the air cavity resonator 12 and the CWG resonator 10 increases as the height H of the CWG resonator bottom wall 50 above the air cavity resonator bottom wall 52 increases, up to a certain point that can be determined by experimentation or simulation.

Figure 6:
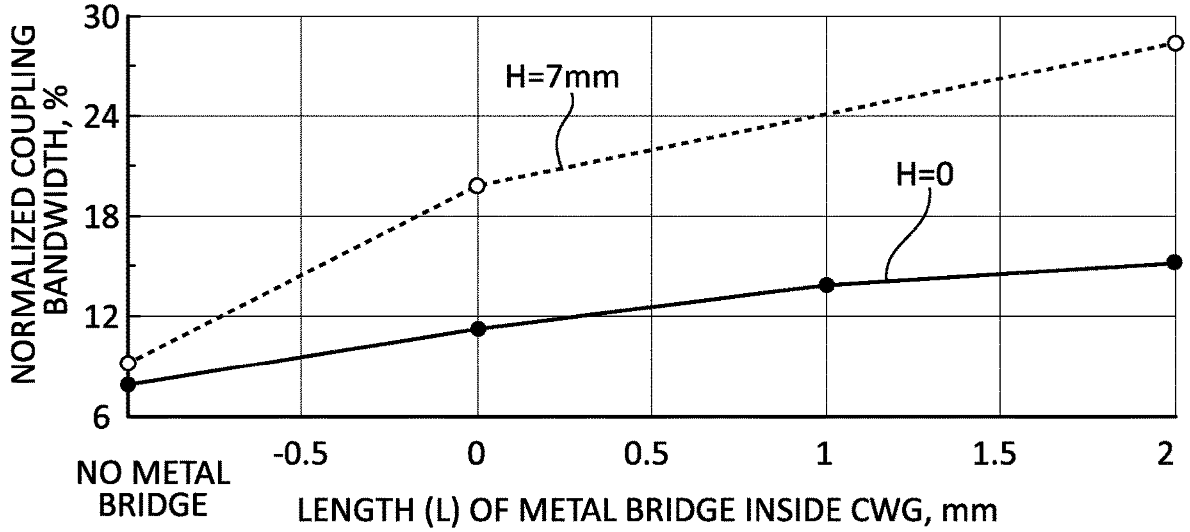
FIG. 6 is a graph of normalized coupling bandwidth in percent versus length L and height H.

FIG. 6 is a graph of normalized coupling bandwidth in percent versus the length L to which the metal bridge 46 extends into the interior of the CWG resonator 10, for two different heights H of the CWG resonator bottom wall 50 above the air cavity resonator bottom wall 52. The upper curve is for a height of H=7 millimeters (mm) and the lower curve is for a height of H=0. On the left, the normalized coupling bandwidth when there is no metal bridge 46 is shown below 10% for either height H=7 or H=0. A significant improvement can be achieved by including the metal bridge even when L=0, where the normalized coupling bandwidth is above 10% for H=0, and is above 18% for H=7 mm. The normalized coupling bandwidth increases as L increase, at least up to a certain length L. In FIG. 6, the air cavity resonator 12 has a length of 20.3 mm, a width of 17.3 mm and a height of 19.3 mm. The CWG resonator 10 has a length of 14.3 mm, a width of 17 mm and a height of 9 mm. The coupling window has a length of 17 mm and a height of 9 mm. Simulations also show that the amount of coupling of energy between the air cavity resonator 12 and the CWG resonator 10 increases as the thickness and/or width of the metal bridge 46 increases. In some embodiments, a bridge made at least in part of material other than metal may be employed in place of the metal bridge 46.

Figure 7A:
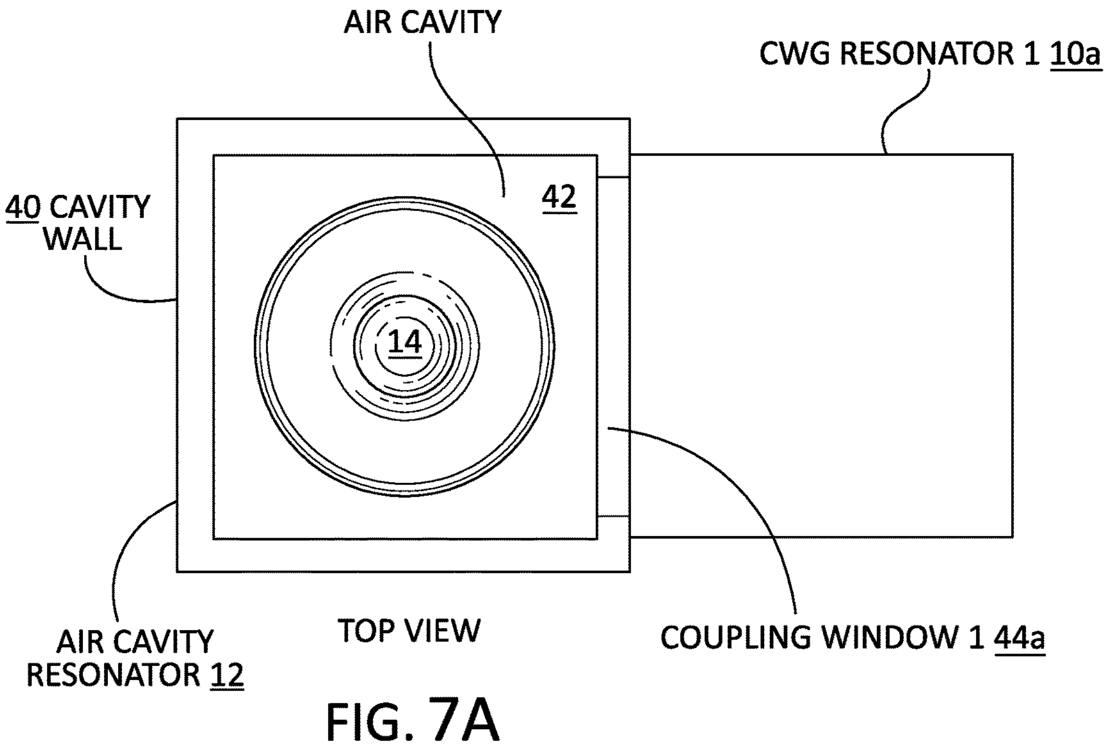
FIG. 7A is a top view of two CWG resonators combined with an air cavity resonator.
Figure 7B:
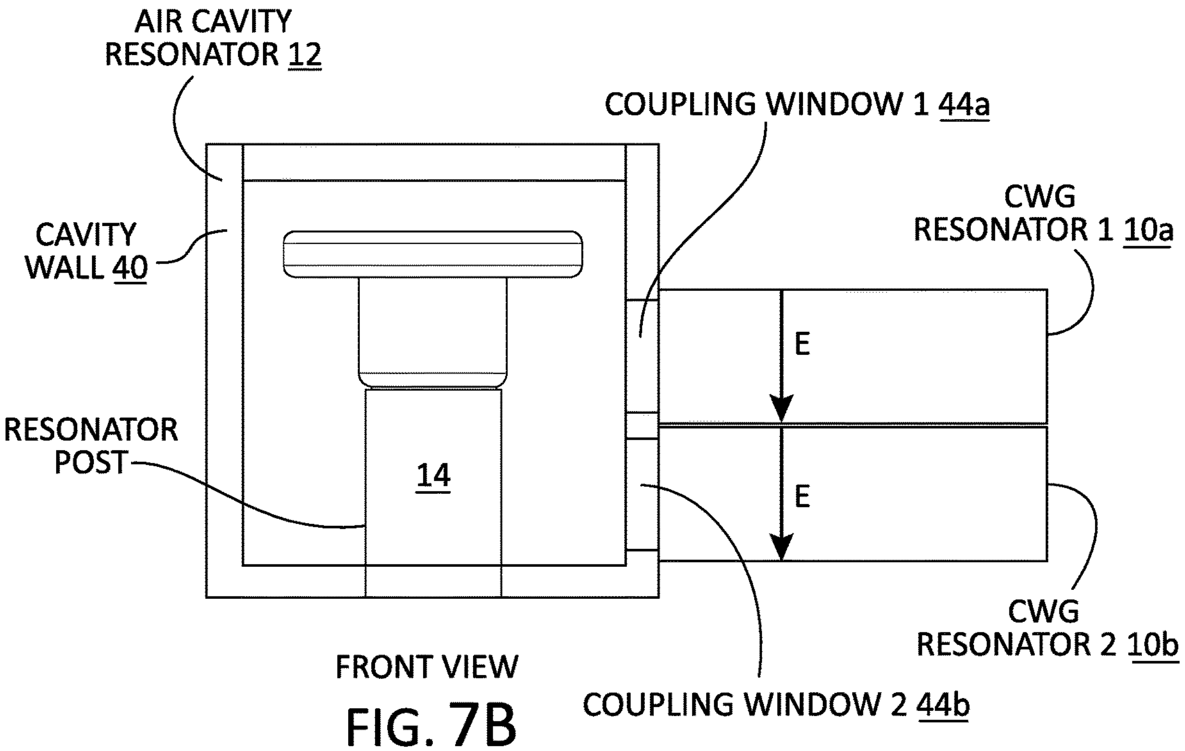
FIG. 7B is a front view of the configuration of FIG. 7A.

FIGS. 7A and 7B show one possible configuration for coupling energy between an air cavity resonator 12 and first and second CWG resonators 10*a* and 10*b*, through first and second windows 44*a* and 44*b*, respectively. For some applications, strong coupling between the magnetic fields of the first CWG resonator 10*a* and the air cavity resonator 12 is desired and strong coupling between the magnetic fields of the second CWG resonator 10*b* and the air cavity resonator 12 is also desired. A disadvantage of the configuration of FIGS. 7A and 7B is that there is also strong coupling of the electric fields of the first and second CWG resonators 10*a* and 10*b*, and this is undesirable for some applications. For example, when both CWG resonators 10*a* and 10*b* are rectangular ceramic-loaded cavities and dimensioned to operate in a TE mode at a frequency of operation, the electric fields in the CWG resonators 10*a* and 10*b* will both be vertical, as shown in FIG. 7B, and strongly coupled in their opening areas. In the embodiment of FIGS. 7A and 7B, not only is the coupling between the two CWG resonators 10*a* and 10*b* strong, the coupling between either of these resonators and the air cavity resonator 12 is reduced because of the strong coupling between the two CWG resonators 10*a* and 10*b*.

Figure 8A:
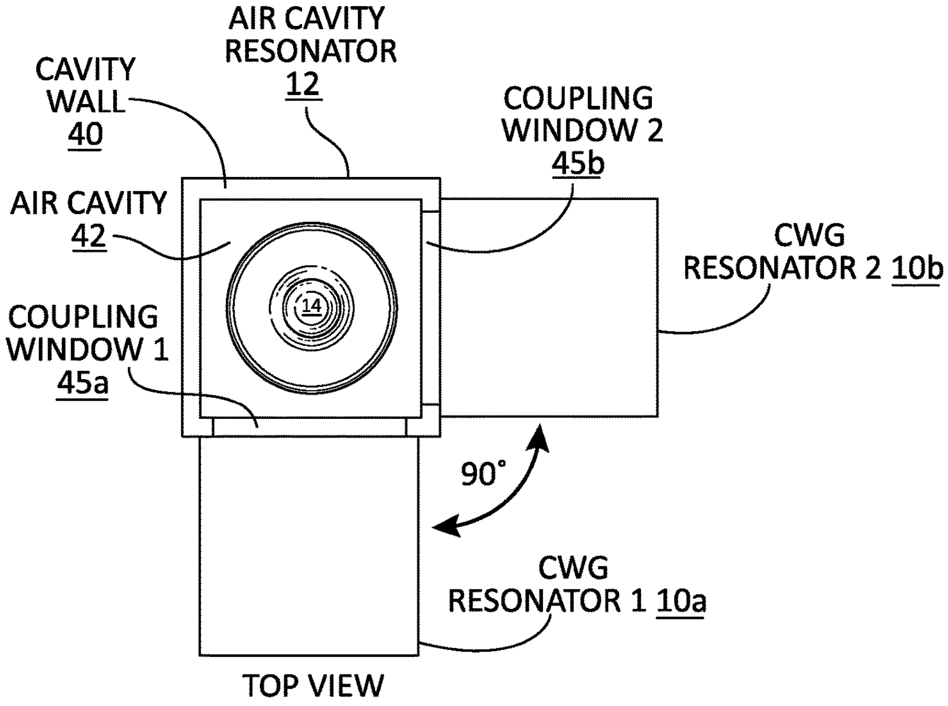
FIG. 8A is top view of an alternative configuration of two CWG resonators combined with an air cavity resonator.
Figure 8B:
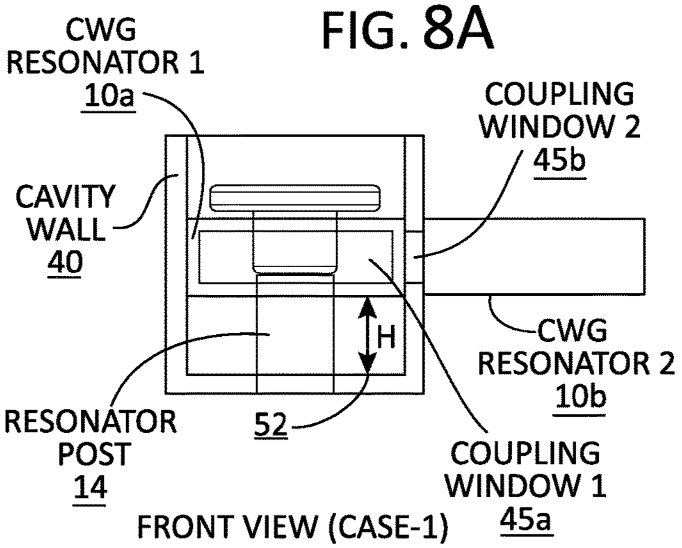
FIG. 8B is a front view of the configuration of FIG. 8A with the two CWG resonators at a same height.
Figure 8C:
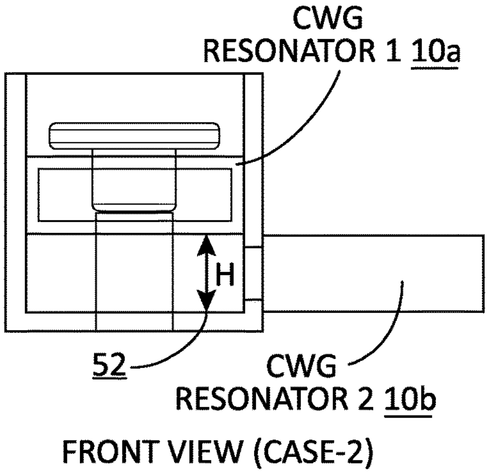
FIG. 8C is a front view of the configuration of FIG. 8A with the two CWG resonators at different heights.

FIGS. 8A, 8B and 8C show a configuration for coupling energy between an air cavity resonator 12 and first and second CWG resonators 10*a* and 10*b*, that overcomes the problem of strong coupling between the CWG resonators 10*a* and 10*b* when they are both coupled to the air cavity resonator 12. In the embodiment of FIGS. 8A, 8B and 8C, the first CWG resonator 10*a* is coupled to the air cavity resonator 12 through a first window 45*a* in the cavity wall 40 on a first side of the air cavity resonator 12. The second CWG resonator 10*b* is coupled to the air cavity resonator 12 through a second window 45*b* in the cavity wall 40 on a second side of the air cavity resonator 12. In particular, in the embodiment of FIGS. 8A, 8B and 8C, the windows 45*a* and 45*b* are in side walls of the air cavity resonator that are orthogonal (at a 90 degree angle). This, substantially reduces the amount of coupling between the first CWG resonator 10*a* and the second CWG resonator 10*b*. An angle of 90 degrees may give the lowest coupling between CWG resonators 10*a* and 10*b*. However angles of more or less than 90 degrees may be implemented in some embodiments. In particular, orientation of the two CWG resonators 10*a* and 10*b* to be on orthogonal sides of the air cavity resonator 12, reduces direct magnetic and electric field coupling between the two CWG resonators 10*a* and 10*b*. In addition to suppressing the coupling of energy between one CWG resonator 10*a* and another CWG resonator 10*b*, the configuration of FIGS. 8A, 8B and 8C suggests a way of coupling two or more CWGFs to at least one air cavity filter for dual band duplexer operation, as explained below.

FIGS. 8B and 8C show two possible configurations that can be seen in the front view (case-1) of FIG. 8B and the front view (case-2) of FIG. 8C. In case 1, the first CWG resonator 10*a* and the second CWG resonator 10*b* are at the same height H above the bottom wall 52 of the air cavity resonator 12. In case 2, the first CWG resonator 10*a* is at a first height H above the bottom wall 52 and the second CWG resonator 10*b* is at zero height above the bottom wall 52 of the air cavity resonator 12. Thus, in some embodiments, the first and second CWG resonators 10*a* and 10*b* are at different heights H1 and H2 above the bottom wall 52 of the air cavity resonator 12, where H1 and H2 could both be nonzero. When the two CWG resonators 10*a* and 10*b* are at different heights H1 and H2, there is even less coupling of energy between the two CWG resonators 10*a* and 10*b* than if they were at the same height.

Table 1 shows the coupling bandwidths obtained in simulations for the configurations of FIGS. 7A and 7B, and FIGS. 8B and 8C. The table shows that the coupling bandwidth between the first and second CWG resonators 10*a* and 10*b* can be at least as low as 0.57%, which is very small compared to the achievable coupling bandwidth between either of the CWG resonators 10*a*, 10*b* and the air cavity resonator 12. Such a low coupling bandwidth between CWG resonators is desired for dual band duplexer operation, which may be achieved according to embodiments discussed below.

TABLE 1

| Coupling Bandwidth | Between the air cavity resonator and first CWG resonator | Between the air cavity resonator and the second CWG resonator | Between the first and second CWG resonators |
|---|---|---|---|
| FIGS. 7A and 7B | 5.95% | 4.76% | −4.85% |
| FIG. 8B | 10.96% | 9.31% | 3.02% |
| FIG. 8C | 9.99% | 6.84% | 0.57% |

Figure 9A:
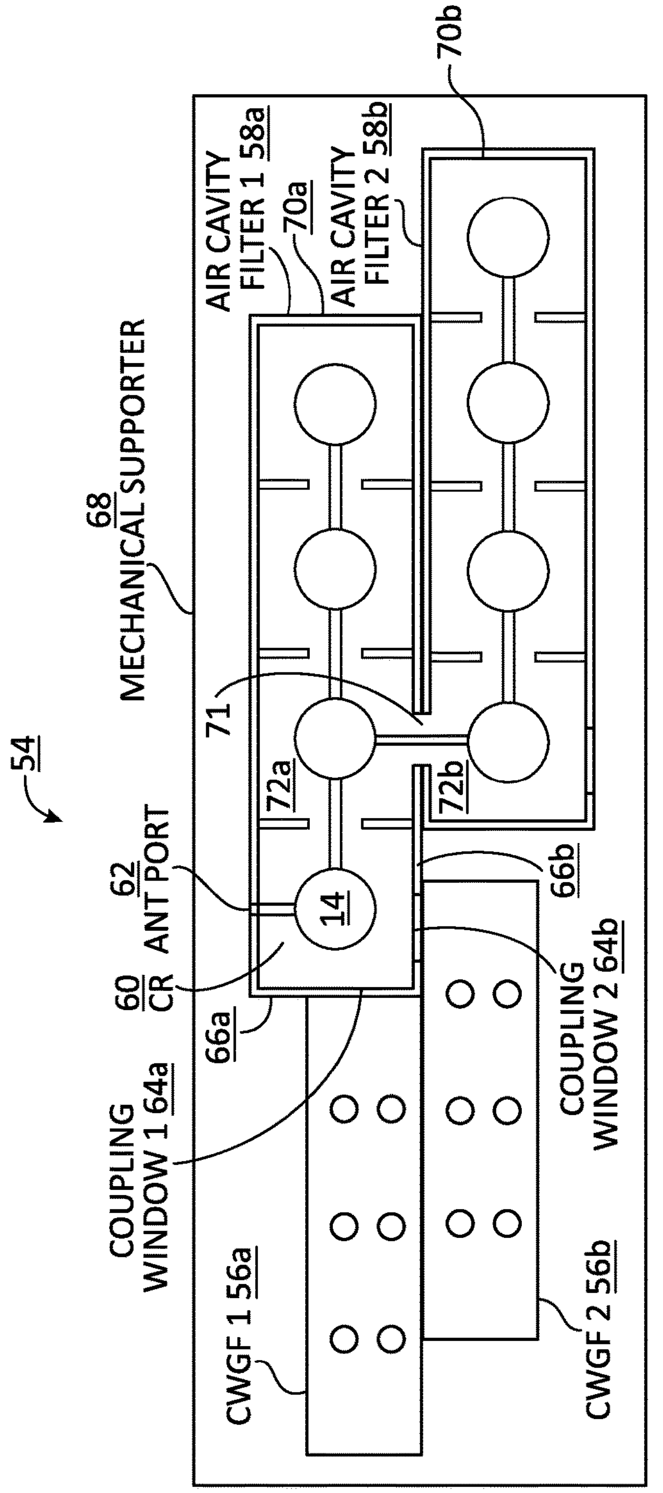
FIG. 9A is a top view of a first embodiment of a dual band duplexer.
Figure 9B:
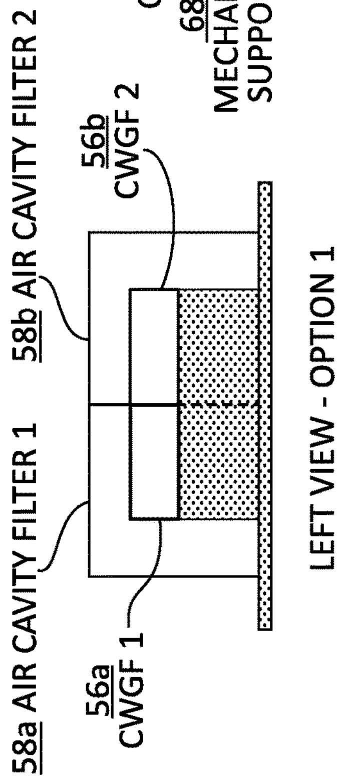
FIG. 9B is a left view of the configuration of FIG. 9A with two CWG resonators at a same height.
Figure 9C:
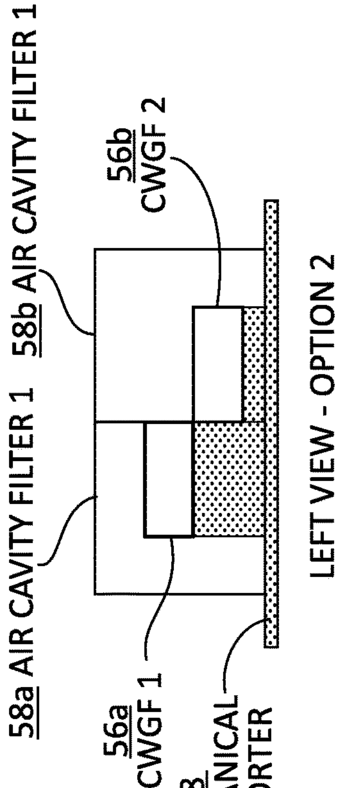
FIG. 9C is a left view of the configuration of FIG. 9A with two CWG resonators at different heights.

FIGS. 9A, 9B and 9C illustrate views of a first example embodiment of a dual band duplexer structure 54 that includes two ceramic waveguide filters 56*a* and 56*b* and two air cavity filters 58*a* and 58*b*. The first CWGF 56*a* is coupled to a common resonator 60 that has an antenna port 62. The common resonator 60 may be considered to be a resonator section or filter stage of the first air cavity filter 58*a*. The second CWGF 56*b* is coupled to the common resonator 60. The first CWGF 56*a* is coupled to the common resonator 60 through a first window 64*a* in a first wall 66*a* of the common resonator 60 and the second CWGF 56*b* is coupled to the common resonator 60 through a second window 64*b* in a second wall 66*b* of the common resonator 60. The first wall 66*a* and the second wall 66*b* are orthogonal and consequently, the two windows 64*a* and 64*b* are orthogonal. The CWGFs 56*a* and 56*b* and the air cavity filters 58*a* and 58*b* may be supported by a mechanical supporter 68.

As explained in reference to FIG. 9A, the orthogonality and separation of the windows 64*a* and 64*b* minimizes undesired coupling between the first CWGF 56*a* and the second CWGF 56*b*. FIG. 9B, bottom left, shows a first option for configuration of the CWGFs 56*a* and 56*b* and FIG. 9C, bottom right, shows a second option for configuration of the CWGFs 56*a* and 56*b*. In the first option, the two CWGFs 56*a* and 56*b* are at the same height H above the bottom of the air cavity filters 58*a* and 58*b*. In the second option, the two CWGFs 56*a* and 56*b* are different heights H1 and H2 above the bottom of the air cavity filters 58*a* and 58*b*. As explained in reference to FIG. 8C, having the CWGFs 56*a* and 56*b* at different heights further reduces undesired coupling between the two CWGFs 56*a* and 56*b*.

In the configuration of FIGS. 9A, 9B and 9C, there may be added a first metal bridge, such as shown in FIGS. 5A and 5B, that extends from the resonator post 14 of the common resonator 60 through the first window 64*a* into the interior of the first CWGF 56*a*. There also may be added a second metal bridge that extends from the resonator post 14 of the common resonator 60 through the second window 64*b* into the interior of the second CWGF 56*b*. Adding the metal bridges increases the coupling between the common resonator 60 and each CWGF 56*a* and 56*b*. Note that metal bridges can be used in any of the dual band duplexer structures of FIGS. 9A-13B.

Each CWGF 56*a* and 56*b* may be configured to have different pass bands centered at different frequencies. In a frequency duplex system, power to be transmitted by the antenna port 62 at a first transmit frequency is input to a first port at an end wall 70*a* of a first one of the air cavity filters 58*a*. Power to be transmitted by the antenna port 62 at a second transmit frequency is input to a second port at an end wall 70*b* of the second one of the air cavity filters 58*b*. The first and second air cavity filters 58*a* and 58*b* are coupled by a window 71 in the adjacent walls of adjacent air cavity filter sections 72*a* and 72*b*. Power received by the antenna port 62 at a first receive frequency is coupled to the first CWGF 56*a* via the first window 64*a* and power received by the antenna port 62 at a second receive frequency is coupled to the second CWGF 56*b* via the second window 64*b*. In some embodiments, none of the transmit frequencies are the same as any of the receive frequencies.

In some embodiments, the two CWGFs 56*a* and 56*b* have a rectangular cross section and are configured such that a line perpendicular to the broad walls of the CWGFs 56*a* and 56*b* are parallel to an axis of the resonator post 14. Further, the two CWGFs 56*a* and 56*b* may be configured to support a TE mode as shown in FIGS. 1B and 1C that couples with a TEM mode of the common resonator 60.

Figures 10A, 10B, 10C:
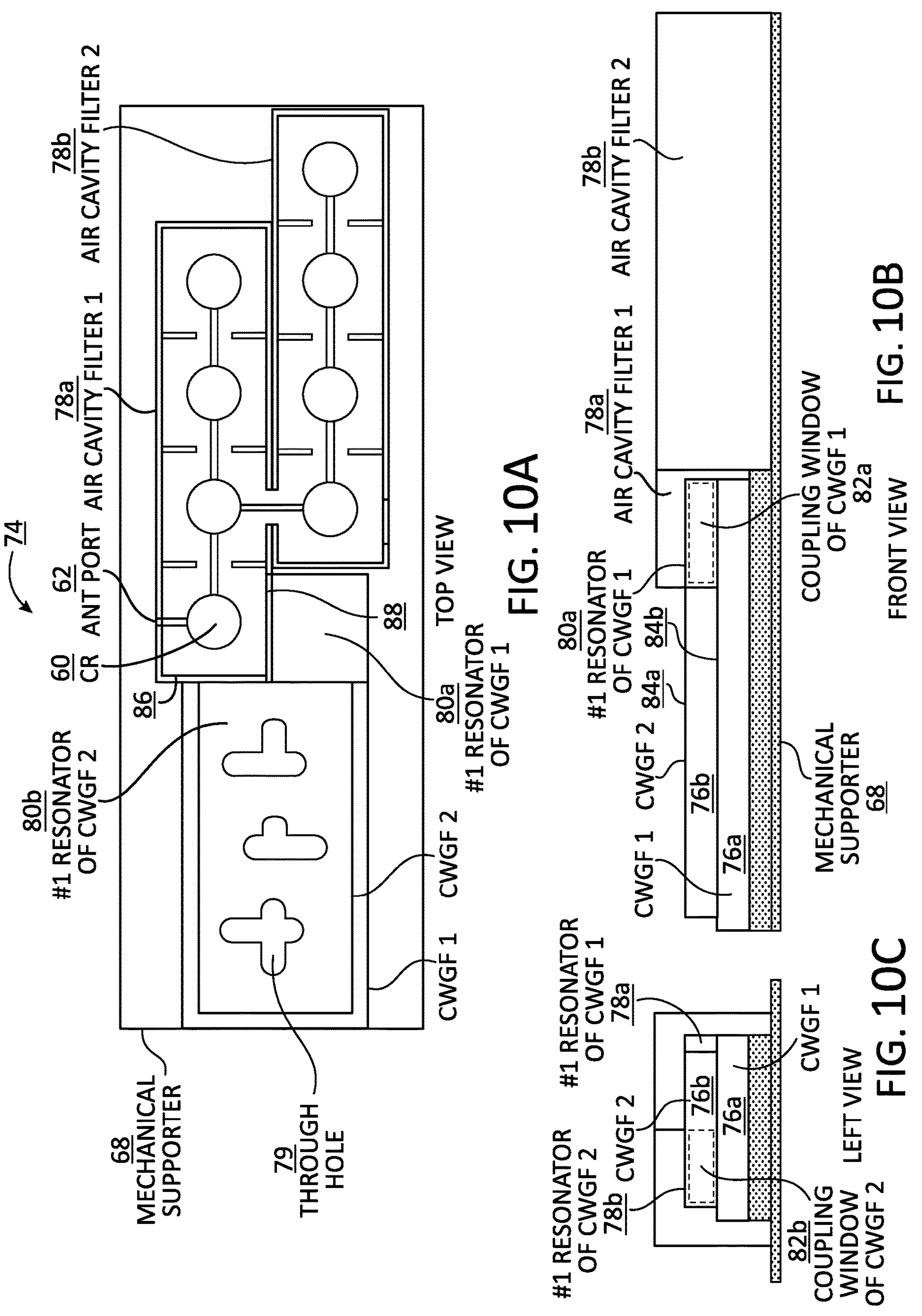
FIG. 10A is a top view of a second embodiment of a dual band duplexer.
FIG. 10B is a front view of the configuration of FIG. 10A.
FIG. 10C is a left view of the configuration of FIG. 10A.

FIGS. 10A, 10B and 10C are views of a second example embodiment of a dual band duplexer structure 74 that includes two ceramic waveguide filters 76*a* and 76*b* and two air cavity filters 78*a* and 78*b*. The top view shows through holes 79 that may partition the CWGF 76*b* into CWG filter sections. The first CWGF 76*a* may also be partitioned into CWG filter sections. A main body of the first CWGF 76*a* is at a lower height than the second CWGF 76*b*. However, the CWGF 76*a* has an upper part at an end forming a first resonator section 80*a* that is coupled through a first coupling window 82*a* to the first air cavity filter 78*a*. Also, the CWGF 76*b* has a second CWG filter section 80*b* that is coupled through a second coupling window 82*b* to the first air cavity filter 78*a*.

In some embodiments, the CWGFs 76*a* and 76*b* have rectangular cross sections and are configured to support a TE mode having the electric field in a direction perpendicular to the upper and lower broad walls 84*a* and 84*b* of respective CWGFs 76*a* and 76*b*. In such configurations, the CWGFs 76*a* and 76*b* support magnetic fields that couple with a magnetic field of a TEM mode supported by the common resonator 60. Note also that the two windows 82*a* and 82*b* are in orthogonal walls 86 and 88 of the first air cavity filter 78*a*.

Figure 11:
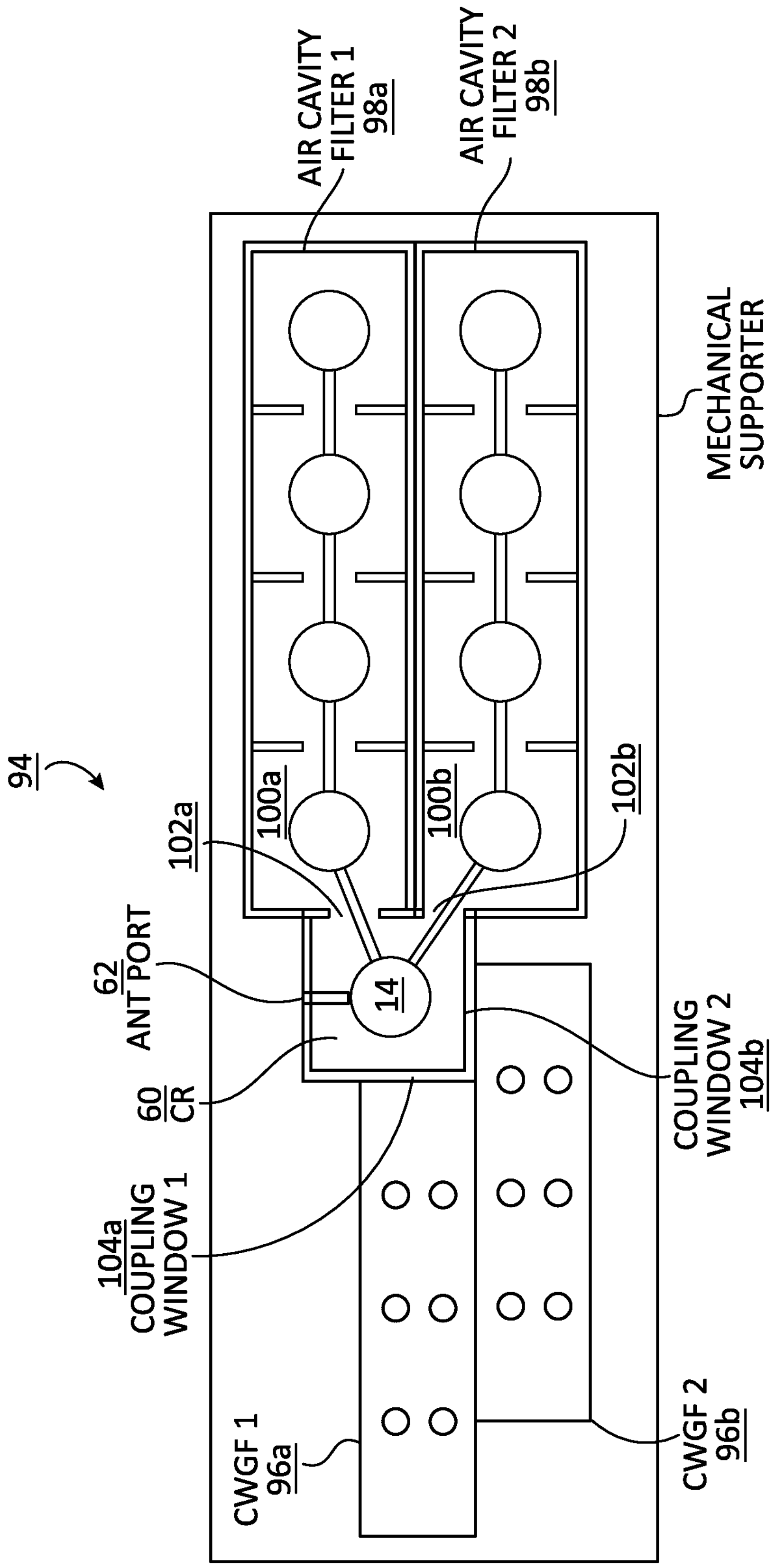
FIG. 11 is an illustration of a third embodiment of a dual band duplexer.

FIG. 11 is an illustration of a third example embodiment of a dual band duplexer structure 94 that includes two ceramic waveguide filters 96*a* and 96*b* and two air cavity filters 98*a* and 98*b*. The first air cavity filter 98*a* has a first air cavity resonator 100*a* (also called a filter section or filter stage) that is coupled through a first window 102*a* to the common resonator 60. The second air cavity filter 98*b* has a second air cavity resonator 100*b* that is coupled through a second window 102*b* to the common resonator 60. In some embodiments, the common resonator 60 is an air cavity resonator similar to the air cavity resonators of FIGS. 5A, 5B and 7A-8C. The common resonator 60 is coupled to the first CWGF 96*a* through a window 104*a* and is coupled to a second CWFG 96*b* through a window 104*b*. The first and second CWGFs 96*a* and 96*b* may be at different heights, as shown in FIG. 9C, option 2. Also, there may be a metal bridge having an end connected to or in proximity to the resonator post 14 of the common resonator 60 and extending into an interior region of a CWGF 96. In some embodiments, there are two metal bridges extending from the resonator post 14 at right angles, each bridge extending into the interior of a different one of the CWGFs 96*a* and 96*b*. These metal bridges may be similar to the metal bridge 46 shown in FIGS. 5A and 5B.

Figure 12:
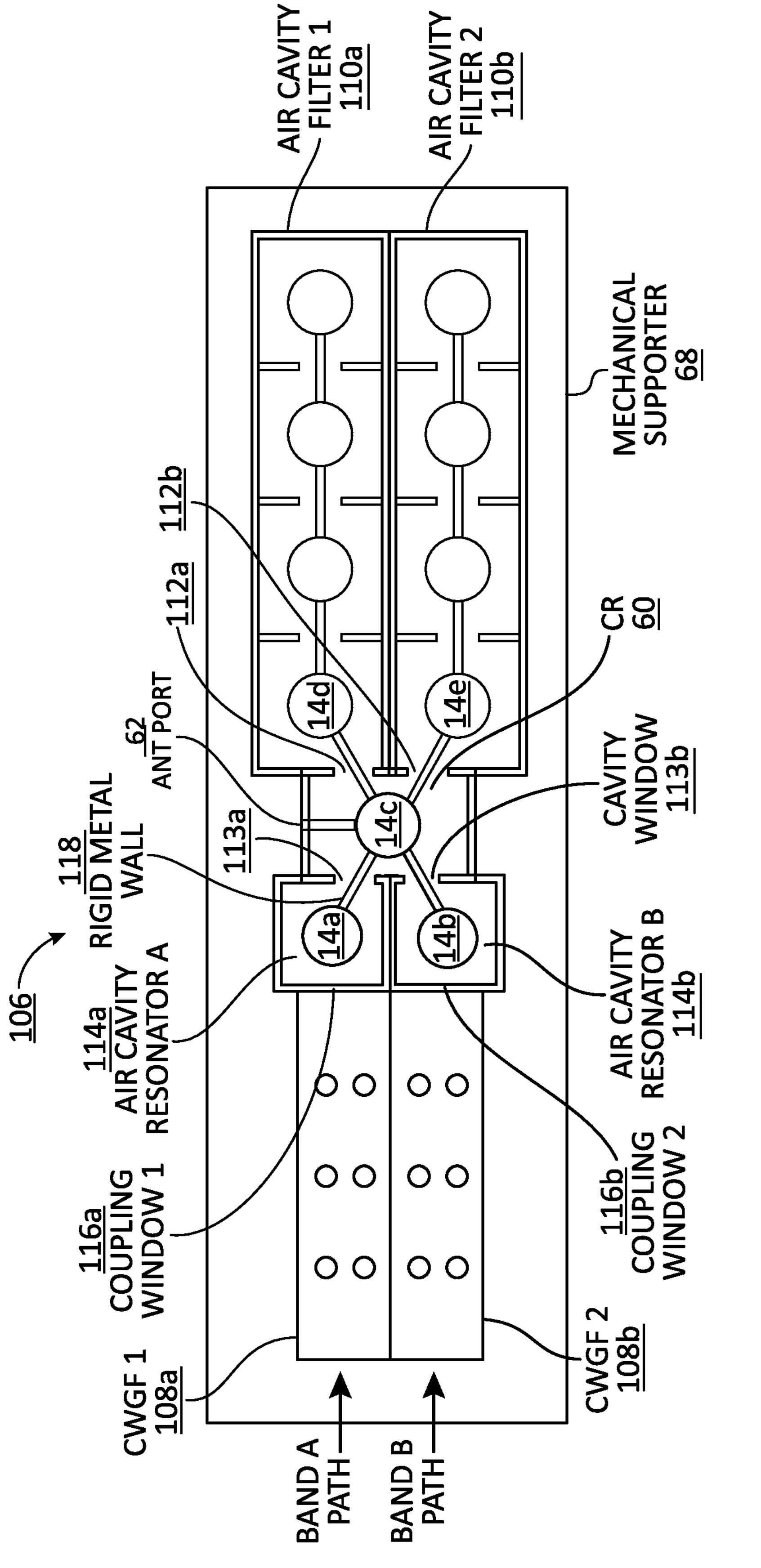
FIG. 12 is an illustration of a fourth embodiment of a dual band duplexer.

FIG. 12 is an illustration of a fourth example embodiment of a dual band duplexer structure 106 that includes two ceramic waveguide filters 108*a* and 108*b* and two air cavity filters 110*a* and 110*b*. The two air cavity filters 110*a* and 110*b* are coupled to the common resonator 60 through windows 112*a* and 112*b*, respectively. First and second air cavity resonators 114*a* and 114*b* are coupled to the common resonator 60 through respective windows 116*a* and 116*b*. The resonator posts 14*a* and 14*b* of the first and second air cavity resonators 114*a* and 114*b* may be connected to the resonator post 14*c* of the common resonator 60 by metal walls 118. Similarly, the resonator posts 14*d* and 14*e* may be connected to the resonator post 14*c* of the common resonator 60 by metal walls 118. Metal walls 118 are not essential and may be omitted if desired.

In the embodiment of FIG. 12, there is substantial isolation between the CWGFs 108*a* and 108*b*. Also, metal bridges such as the metal bridge 46 shown in FIGS. 5A and 5B may extend from the resonator posts 14*a* and 14*b* of the air cavity resonators 114*a* and 114*b* into the interior regions of respective CWGFs 108*a* and 108*b*. Further, there can be substantial isolation between the air cavity resonators 114*a* and 114*b* since the windows 113*a* and 113*a* may be made small and there may be a sufficient separation between them to achieve a desired isolation. Note that the air cavity resonators 114*a* and 114*b* have good passive intermodulation (PIM) performance as compared to the embodiments of FIGS. 9A-11. Another advantage is that the configuration provides for strong coupling between the air cavity resonators 114*a* and 114*b* and the common resonator 60.

Figures 13A, 13B:
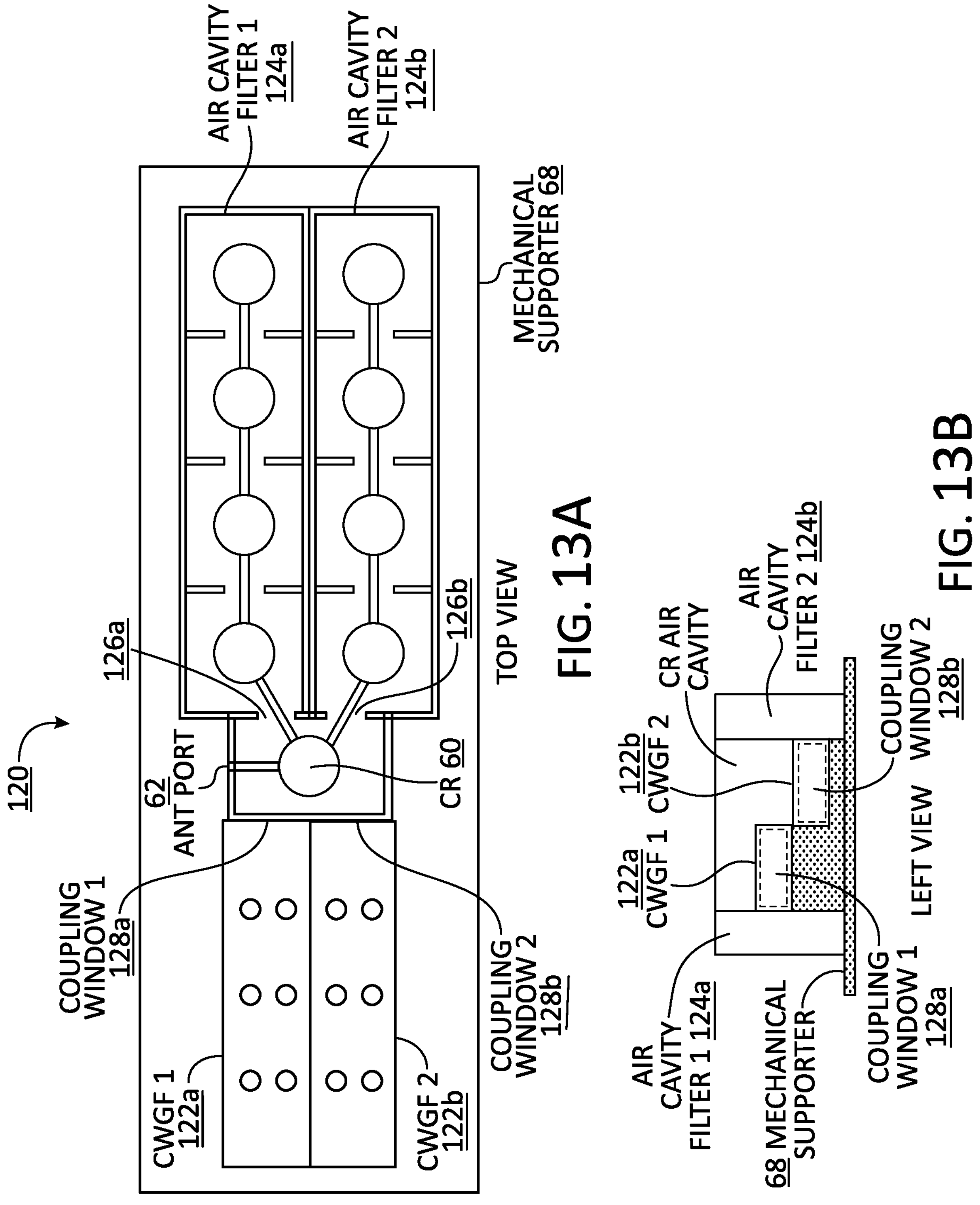
FIG. 13A is top view of a fifth embodiment of a dual band duplexer.
FIG. 13B is a left view of the configuration of FIG. 13A.

FIGS. 13A and 13B illustrate views of a fifth example embodiment of a dual band duplexer structure 120 that includes two ceramic waveguide filters (CWGFs) 122*a* and 122*b* and two air cavity filters 124*a* and 124*b*. The two air cavity filters 124*a* and 124*b* are coupled to the common resonator 60 through windows 126*a* and 126*b*, respectively. The CWGFs 122*a* and 122*b* are coupled to the common resonators 60 through windows 128*a* and 128*b*. In the left view shown at the bottom of FIG. 12, the CWGFs 122*a* and 122*b* are at different heights to reduce coupling between the CWGFs 122*a* and 122*b*. Simulations show that direct coupling can be reduced to less than 1%. Coupling between the CWGFs and the common resonator 60 can be greater than 10%.

According to one aspect, an electromagnetic structure is provided. The structure has an air cavity resonator 12 having a resonator post 14, and at least a first side wall, the first side wall of the air cavity resonator 12 having a first window 44 parallel to a center axis of the resonator post 14. The structure also has a first ceramic waveguide, CWG, resonator 10 having an opening in a side wall of the first CWG resonator 10, the opening being parallel to and at least partially aligned with the first window 44 of the air cavity resonator to couple energy between the air cavity resonator 12 and the CWG resonator 10. The structure also includes a first bridge 46 having a length that extends from the resonator post 14 through the first window 44 of the air cavity resonator 12 into an interior region of the CWG resonator 10.

According to this aspect, in some embodiments, the first bridge 46 includes an electric conductor that makes contact with an edge of the first window 44 of the air cavity resonator 12. In some embodiments, the first CWG resonator 10 is configured to support a transverse electric (TE) mode with a magnetic field aligned with a magnetic field supported by the air cavity resonator 12. In some embodiments, the air cavity resonator 12 has a second side wall having a second window 45*b* and the structure further comprises: a second CWG resonator 10*b* having a second opening in a side wall of the second CWG resonator 10*b*, the second opening being parallel to and at least partially aligned with the second window 45*b* of the air cavity resonator 12 to couple energy between the air cavity resonator 12 and the second CWG resonator 10*b*. In some embodiments, the structure further includes a second bridge having a length that extends from the resonator post 14 through the second window 45*b* of the air cavity resonator 12 into an interior region of the second CWG resonator 10*b*. In some embodiments, the first window 45*a* of the air cavity resonator 12 is orthogonal to the second window 45*b* of the air cavity resonator 12. In some embodiments, the first window 45*a* of the air cavity resonator 12 is at a first height above a bottom wall 52 of the air cavity resonator 12 and the second window 45*b* of the air cavity resonator 12 is at a second height above the bottom wall 52 of the air cavity resonator 12, the second height being different from the first height. In some embodiments, the first CWG resonator 10*a* and the second CWG resonator 10*b* are rectangular with parallel broad walls and parallel narrow walls, the narrow walls being parallel to a center axis of the resonator post 14. In some embodiments, the first window 45*a* of the air cavity resonator 12 is at a first height above the bottom wall 52 of the air cavity resonator, the first height being selected to obtain a specified minimum coupling bandwidth between the air cavity resonator 12 and the first CWGF 56*a*. In some embodiments, the second window 45*b* of the air cavity resonator 12 is at a second height above the bottom wall 52 of the air cavity resonator 12, the second height being selected to reduce coupling of energy between the first and second CWG resonators 10*a* and 10*b* to below a specified maximum allowable coupling. In some embodiments, the first window 45*a* has a thickness forming a middle region between an interior region of the air cavity resonator 12 and an interior region of the CWG resonator 10*a*, the middle region having a material with a relative permittivity greater than one.

According to another aspect, a radio frequency (RF) duplexer is provided. The duplexer 54, 74, 94, 106, 120 includes a common resonator 60 being coupled to at least one chamber 71*a* of an air cavity filter 58*a*, the common resonator 60 having a common resonator bottom wall, a plurality of common resonator side walls and a common resonator post 14, a first common resonator side wall of the plurality of common resonator side walls having a first window 64*a* and a second common resonator side wall of the plurality of common resonator side walls having a second window 64*b*. The duplexer also has a first ceramic waveguide filter 56*a*, CWGF, having a first opening in a first CWG wall of the first CWGF 56*a*, the first opening being parallel to and at least partially aligned with the first window 64*a* of the common resonator 60 to couple energy between the common resonator 60 and the CWGF 56*a*. The duplexer also has a second CWGF 56*b* having a second opening in a second CWG wall of the second CWGF 56*b*, the second opening being parallel to and at least partially aligned with the second window 64*b* of the common resonator 60 to couple energy between the common resonator 60 and the CWGF 56*b*.

According to this aspect, in some embodiments, the first CWGF 56*a* has a first CWG bottom wall positioned at a first height above the common resonator bottom wall and the second CWGF has a second CWG bottom wall at a second height above the common resonator bottom wall, the first and second heights being equal. In some embodiments, the first CWGF 56*a* has a first CWG bottom wall positioned at a first height above the common resonator bottom wall and the second CWGF 56*b* has a second CWG bottom at a second height above the common resonator bottom wall, the first and second heights being unequal. In some embodiments, the first common resonator side wall of the plurality of common resonator side walls is orthogonal to the second common resonator side wall of the plurality of common resonator side walls. In some embodiments, the first common resonator side wall of the plurality of common resonator side walls is the same side wall as the second common resonator side wall of the plurality of common resonator side walls. In some embodiments, the duplexer also includes a first bridge 46 having a first length that extends from an interior region of the common resonator 60 to an interior region of the first CWGF 56*a* through the first window 64*a* and first opening. In some embodiments, the duplexer also includes a second bridge 46 having a second length that extends from the interior region of the common resonator 60 to an interior region of the second CWG 56*b* through the second window 64*b* and second opening. In some embodiments, the common resonator 60 is coupled to a first chamber 72*a* of a first air cavity filter 58*a* and is coupled to a second chamber 72*b* of a second air cavity filter 58*b*. In some embodiments, the second CWGF 76*a* has a plurality of resonator sections on a first level and another resonator section 80*a* at an end and on a second level above the first level. In some embodiments, the first and second CWGs 76*a* and 76*b* are coupled to a receiver and the air cavity filters 58*a* and 58*b* is coupled to a transmitter.

According to yet another aspect, a dual band duplexer is provided. The duplexer includes a common resonator 60 coupled on a first side of the common resonator 60 to a chamber of a first air cavity filter 110*a* and separately coupled on the first side to a chamber of a second air cavity filter 110*b*. The duplexer also includes a first air cavity resonator 114*a* having a first side coupled to a second side of the common resonator 60, the second side of the common resonator 60 being opposite the first side of the common resonator 60. The duplexer also includes a second air cavity resonator 114*b* having a first side coupled to the second side of the common resonator 60. The duplexer further includes a first ceramic waveguide filter, CWGF 108*a*, coupled at an end wall to a second side of the first air cavity resonator 114*a*, the second side of the first air cavity resonator 114*a* being opposite the first side of the first air cavity resonator 114*a*; and a second CWGF 108*b* coupled at an end wall to a second side of the second air cavity resonator 114*b*, the second side of the second air cavity resonator 114*b* being opposite the first side of the second air cavity resonator 114*b*.

According to this aspect, in some embodiments, the duplexer further includes a first bridge 46 having a first length extending from an interior of the first air cavity resonator 114*a* to an interior of the first CWGF 108*a* through a first coupling window 116*a*. In some embodiments, the duplexer also includes a second bridge 46 having a second length extending from an interior of the second air cavity resonator 114*b* to an interior of the second CWGF 108*b* through a second coupling window 116*b*. In some embodiments, dimensions of the second CWGF 108*b* equal the corresponding dimensions of the first CWGF 108*a*.

According to another aspect, an electromagnetic filter is provided. The electromagnetic filter includes an air cavity filter 24 having: a bottom wall, parallel side walls, a first end wall 34 at a first end of the air cavity filter 24, the first end wall 34 having a first input/output port 36, and a second end wall at a second end of the air cavity filter 24*a* opposite the first end of the air cavity filter 24. The air cavity filter 24 also has a first chamber 12*d* at the first end of the air cavity filter 24, the first chamber 12*d* being formed in part by the first end wall 34 and the parallel side walls; and a second chamber 12*a* at the second end of the air cavity filter 24, the second chamber 12*a* having a resonator post 14*a*, the second chamber 12*a* being formed in part by the second end wall and the parallel side walls, a first side wall of the parallel side walls having a first window 28 located in the second chamber 12*a*. The electromagnetic filter also includes a ceramic waveguide filter, CWGF 26, having parallel first and second broad walls, the first broad wall being adjacent to the first side wall of the parallel side walls, the first broad wall having an opening at least partially aligned with the first window 28 located in the second chamber 12*a*, the second broad wall having a second input/output port 32.

According to this aspect, in some embodiments, the electromagnetic filter further includes a bridge 46 that extends from an interior region of the second chamber 12*a* through the first window 28 and the opening to an interior region of the CWGF 26. In some embodiments, the opening in the first broad wall of the CWGF 26 and the second input/output port 32 in the second broad wall of the CWGF 26 are in proximity to opposite ends of the CWGF 26. In some embodiments, an area of the first broad wall of the CWGF 26 is smaller than an area of the first side wall of the parallel side walls of the air cavity filter 24 and wherein the opening is further away from the first input/output port 36 than to the second input/output port 32. In some embodiments, the CWGF 26 is configured to support a transverse electric (TE) mode with an electric field aligned with a radial electric field supported by the second chamber 12*a*.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviations that may be used in the preceding description include: | |
|---|---|
| AAS | Active Antenna System |
| CR | Common Resonator |
| CWG | Ceramic Wave Guide |
| CWGF | Ceramic Wave Guide Filter |
| EM | Electromagnetic |
| FDD | Frequency Division Duplex |
| PCB | Printed Circuit Board |
| Q | Quality |
| Res | Resonator |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An electromagnetic structure, comprising:

an air cavity resonator having a resonator post, and at least a first side wall, the first side wall of the air cavity resonator having a first window parallel to a center axis of the resonator post;

a first ceramic waveguide, CWG, resonator having an opening in a side wall of the first CWG resonator, the opening being parallel to and at least partially aligned with the first window of the air cavity resonator to couple energy between the air cavity resonator and the first CWG resonator; and a first bridge having a length that extends from the resonator post through the first window of the air cavity resonator into an interior region of the first CWG resonator, wherein the first bridge includes an electric conductor that makes contact with an edge of the first window of the air cavity resonator.

2. The structure of claim 1, wherein the first window of the air cavity resonator is at a first height above a bottom wall of the air cavity resonator, the first height being selected to obtain a specified minimum coupling bandwidth between the air cavity resonator and the first CWG resonator.

3. The structure of claim 1, wherein the first CWG resonator is configured to support a transverse electric (TE) mode with a magnetic field aligned with a magnetic field supported by the air cavity resonator.

4. The structure of claim 1, wherein the air cavity resonator has a second side wall having a second window and the structure further comprises:

a second CWG resonator having a second opening in a side wall of the second CWG resonator, the second opening being parallel to and at least partially aligned with the second window of the air cavity resonator to couple energy between the air cavity resonator and the second CWG resonator.

5. The structure of claim 4, further comprising a second bridge having a length that extends from the resonator post through the second window of the air cavity resonator into an interior region of the second CWG resonator.

6. The structure of claim 4, wherein the first window of the air cavity resonator is orthogonal to the second window of the air cavity resonator.

7. The structure of claim 4, wherein the first window of the air cavity resonator is at a first height above a bottom wall of the air cavity resonator and the second window of the air cavity resonator is at a second height above a bottom wall of the air cavity resonator, the second height being different from the first height.

8. The structure of claim 4, wherein the first CWG resonator and the second CWG resonator are rectangular with parallel broad walls and parallel narrow walls, the parallel narrow walls being parallel to the center axis of the resonator post.

9. The structure of claim 4, wherein the first window of the air cavity resonator is at a first height above a bottom wall of the air cavity resonator, the first height being selected to obtain a specified minimum coupling bandwidth between the air cavity resonator and the first CWG resonator, and wherein the second window of the air cavity resonator is at a second height above the bottom wall of the air cavity resonator, the second height being selected to reduce coupling of energy between the first and second CWG resonators to below a specified maximum allowable coupling bandwidth.

10. The structure of claim 1, wherein the first window has a thickness forming a middle region between an interior region of the air cavity resonator and an interior region of the first CWG resonator, the middle region having a material with a relative permittivity greater than one.

11. A radio frequency (RF) duplexer, comprising:

a common resonator being coupled to at least one chamber of an air cavity filter, the common resonator having a common resonator bottom wall, a plurality of common resonator side walls and a common resonator post, a first common resonator side wall of the plurality of common resonator side walls having a first window and a second common resonator side wall of the plurality of common resonator side walls having a second window;

a first ceramic waveguide filter, CWGF, having a first opening in a first CWG wall of the first CWGF, the first opening being parallel to and at least partially aligned with the first window of the common resonator to couple energy between the common resonator and the first CWGF; and a second CWGF having a second opening in a second CWG wall of the second CWGF, the second opening being parallel to and at least partially aligned with the second window of the common resonator to couple energy between the common resonator and the second CWGF.

12. The duplexer of claim 11, wherein the first and second CWGFs are coupled to a receiver and the air cavity filter is coupled to a transmitter.

13. The duplexer of claim 11, wherein the first CWGF has a first CWG bottom wall positioned at a first height above the common resonator bottom wall and the second CWGF has a second CWG bottom wall at a second height above the common resonator bottom wall, the first and second heights being equal.

14. The duplexer of claim 11, wherein the first CWGF has a first CWG bottom wall positioned at a first height above the common resonator bottom wall and the second CWGF has a second CWG bottom wall at a second height above the common resonator bottom wall, the first and second heights being equal.

15. The duplexer of claim 11, wherein the first common resonator side wall of the plurality of common resonator side walls is orthogonal to the second common resonator side wall of the plurality of common resonator side walls.

16. The duplexer of claim 11, wherein the first common resonator side wall of the plurality of common resonator side walls is the same side wall as the second common resonator side wall of the plurality of common resonator side walls.

17. The duplexer of claim 11, further comprising a first bridge having a first length that extends from an interior region of the common resonator to an interior region of the first CWGF through the first window and first opening.

18. The duplexer of claim 17, further comprising a second bridge having a second length that extends from the interior region of the common resonator to an interior region of the second CWGF through the second window and second opening.

19. The duplexer of claim 11, wherein the common resonator is coupled to a first chamber of a first air cavity filter and is coupled to a second chamber of a second air cavity filter.

20. The duplexer of claim 11, wherein the second CWGF has a plurality of resonator sections on a first level and another resonator section at an end of the second CWGF and on a second level above the first level.

21. A dual band duplexer, comprising:

a common resonator coupled on a first side of the common resonator to a chamber of a first air cavity filter and separately coupled on the first side to a chamber of a second air cavity filter;

a first air cavity resonator having a first side coupled to a second side of the common resonator, the second side of the common resonator being opposite the first side of the common resonator;

a second air cavity resonator having a first side coupled to the second side of the common resonator;

a first ceramic waveguide filter, CWGF, coupled at an end wall to a second side of the first air cavity resonator, the second side of the first air cavity resonator being opposite the first side of the first air cavity resonator; and a second CWGF coupled at an end wall to a second side of the second air cavity resonator, the second side of the second air cavity resonator being opposite the first side of the second air cavity resonator.

22. The duplexer of claim 21, further comprising a first bridge having a first length extending from an interior of the first air cavity resonator to an interior of the first CWGF through a first coupling window.

23. The duplexer of claim 22, further comprising a second bridge having a second length extending from an interior of the second air cavity resonator to an interior of the second CWGF through a second coupling window.

24. An electromagnetic filter, comprising:

an air cavity filter having:

a bottom wall, parallel side walls, a first end wall at a first end of the air cavity filter, the first end wall having a first input/output port, and a second end wall at a second end of the air cavity filter opposite the first end of the air cavity filter;

a first chamber at the first end of the air cavity filter, the first chamber being formed in part by the first end wall and the parallel side walls; and a second chamber at the second end of the air cavity filter, the second chamber having a resonator post, the second chamber being formed in part by a second end wall and the parallel side walls, a first side wall of the parallel side walls having a first window located in the second chamber; and a ceramic waveguide filter, CWGF, having parallel first and second broad walls, the first broad wall being adjacent to the first side wall of the parallel side walls, the first broad wall having an opening at least partially aligned with the first window located in the second chamber, the second broad wall having a second input/output port.

25. The filter of claim 24, further comprising a bridge that extends from an interior region of the second chamber through the first window and the opening to an interior region of the CWGF.

26. The filter of claim 24, wherein the opening in the first broad wall of the CWGF and the second input/output port in the second broad wall of the CWGF are in proximity to opposite ends of the CWGF.

27. The filter of claim 26, wherein an area of the first broad wall of the CWGF is smaller than an area of the first side wall of the parallel side walls of the air cavity filter and wherein the opening in the first broad wall is further away from the first input/output port than to the second input/output port.

* * * * *